United States Patent [19]
Hall et al.

[11] Patent Number: 5,355,867
[45] Date of Patent: Oct. 18, 1994

[54] PORTABLE GRILL

[76] Inventors: Richard L. Hall, 8202 E. Sells, Scottsdale, Ariz. 85251; Jeffrey D. Hebets, 4001 N. 45th Street, Phoenix, Ariz. 85018

[21] Appl. No.: 37,314

[22] Filed: Mar. 26, 1993

[51] Int. Cl.⁵ .............................. F24B 3/00
[52] U.S. Cl. ........................ 126/30; 126/29; 99/446; 248/156
[58] Field of Search ........... 126/30, 9 R, 25 R, 29, 126/25 A; 99/446, 449, 450; 248/156

[56] References Cited

U.S. PATENT DOCUMENTS

| | | | |
|---|---|---|---|
| 2,604,884 | 7/1952 | Walker | 126/30 |
| 2,960,979 | 11/1960 | Stone | 126/25 |
| 2,974,662 | 3/1961 | Forrest | 126/30 |
| 2,977,953 | 4/1961 | Dowdy | 126/30 |
| 3,261,344 | 7/1966 | Petrie | 126/30 |
| 4,351,312 | 9/1982 | Ivy | 126/30 |
| 4,538,589 | 9/1985 | Preston | 126/30 |
| 4,719,898 | 1/1988 | Stanislawski | 126/30 |
| 4,856,423 | 8/1989 | Burns | 126/30 X |
| 4,896,651 | 1/1990 | Kott, Jr. | 126/30 |
| 4,979,490 | 12/1990 | Nudo et al. | 126/29 X |
| 5,117,806 | 6/1992 | Soat | 126/29 |

Primary Examiner—Larry Jones
Attorney, Agent, or Firm—Jordan M. Meschkow; Don J. Flickinger; Lowell W. Gresham

[57] ABSTRACT

A portable grill including a vertical grill base, an inner sleeve received by the grill base for rotatable and slidable movement about the grill base, a J hook affixed adjacent the upper end of the grill base, a chain attached to the inner sleeve for engagement of the J hook allowing the sleeve to be raised and lowered relative to a fire, two grill portions extending outwardly from the inner sleeve for support over a fire, and a stop affixed to the lower end of the inner sleeve for support of the gratings.

23 Claims, 2 Drawing Sheets

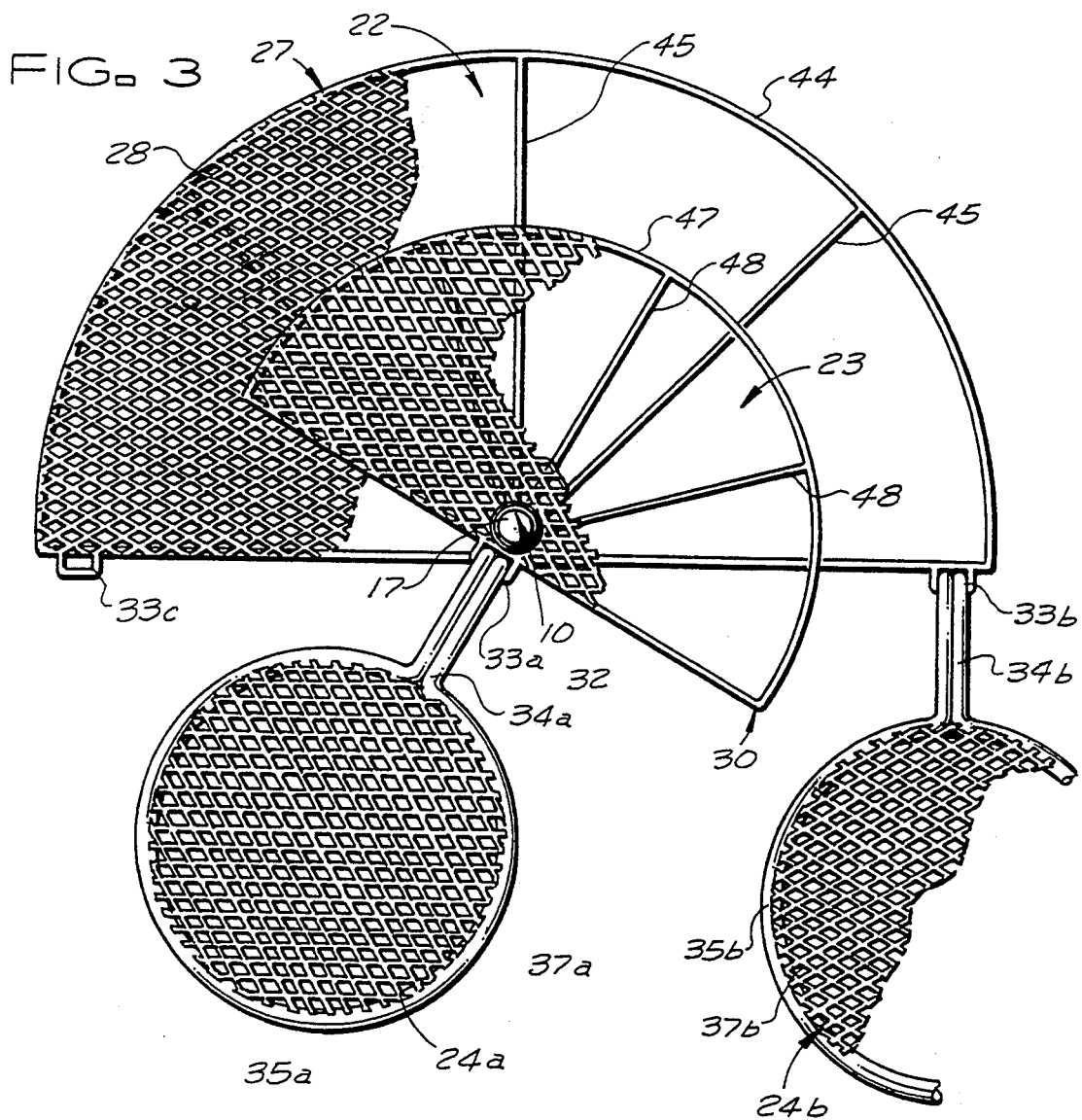
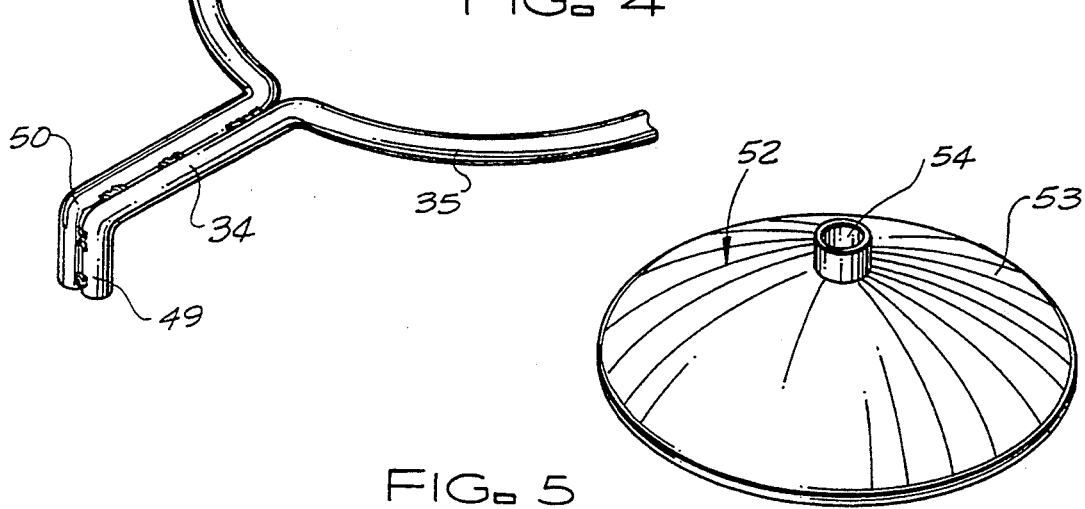

PORTABLE GRILL

BACKGROUND OF THE INVENTION

1. Field of the Invention

This invention relates to grill assemblies.

More particularly the present invention relates to portable grill assemblies.

In a further and more specific aspect, the instant invention concerns a portable grill assembly for adjustably supporting food over a fire.

2. Prior Art

Grills for cooking food with a fire are well known. Typically these grills are considered self-contained, storing and isolating the fire as well as supporting food over said fire. Generally these grills are large, heavy and cumbersome due to the space needed to isolate the fire. This makes the grills inconvenient to transport and store. Often these grills have limited adjustment capabilities because of the space needed for fire isolation and storage.

While the above mentioned grills can be used in many situations, they may not be appropriate for excursions, such as picnics or camping. In such excursions, a readily transportable and compact grill is needed. Generally, in these situations, a fire is built on the ground and rocks or bricks are used to support a simple grating over the fire.

These simple gratings are light and easy to carry but their adjustment ability and cooking space are restricted. Most cooking is done over a direct flame and these gratings can not be freely raised or lowered to moderate cooking temperatures or times. A small cooking surface is typical, because the gratings lack stability and adequate support. This makes cooking a whole meal or cooking for several people complicated.

It would be highly advantageous, therefore, to remedy the foregoing and other deficiencies inherent in the prior art.

Accordingly, it is an object of the present invention to provide an improved portable grill assembly.

Another object of the invention is the provision of a portable grill assembly that is simple to use.

And another object of the invention is to provide a portable grill assembly that is highly versatile.

Still another object of this invention is the provision of a portable grill that is easily transportable.

Yet another object of the invention is to provide a highly adjustable portable grill assembly.

Yet still another object of the immediate invention is the provision of a portable grill assembly that is compact for easy storage.

And a further object of the invention is to provide a portable grill assembly that is inexpensive and simple to manufacture.

Still a further object of the invention is the provision of a portable grill assembly for improved cooking performance over a fire.

And still another object of the invention is to provide a portable grill assembly which increases the available cooking space.

SUMMARY OF THE INVENTION

Briefly, to achieve the desired objects of the invention in accordance with the preferred embodiments thereof, provided is a portable grill assembly with grill portions for supporting food and a vertical grill base that supports the grill portions over a fire. The grill portions are attached to an inner sleeve and the inner sleeve is rotatably and slidably received about the vertical grill base for movement about the vertical grill base. The inner sleeve has a stop affixed adjacent to the lower end for support of the grill portions and an adjustment assembly affixed adjacent to the upper end for positioning along the vertical grill base.

BRIEF DESCRIPTION OF THE DRAWINGS

The foregoing and further and more specific objects and advantages of the instant invention will become readily apparent to those skilled in the art from the following detailed description of the preferred embodiments thereof taken in conjunction with the drawings, in which:

FIG. 3 is a top plan view of the portable grill assembly illustrated in FIG. 1;

FIG. 4 is an enlarged perspective view of a portion of the portable grill assembly of FIG. 1; and FIG. 5 is a perspective view of a base for use with the portable grill assembly of FIG. 1.

BRIEF DESCRIPTION OF THE PREFERRED EMBODIMENT

Figure 1:
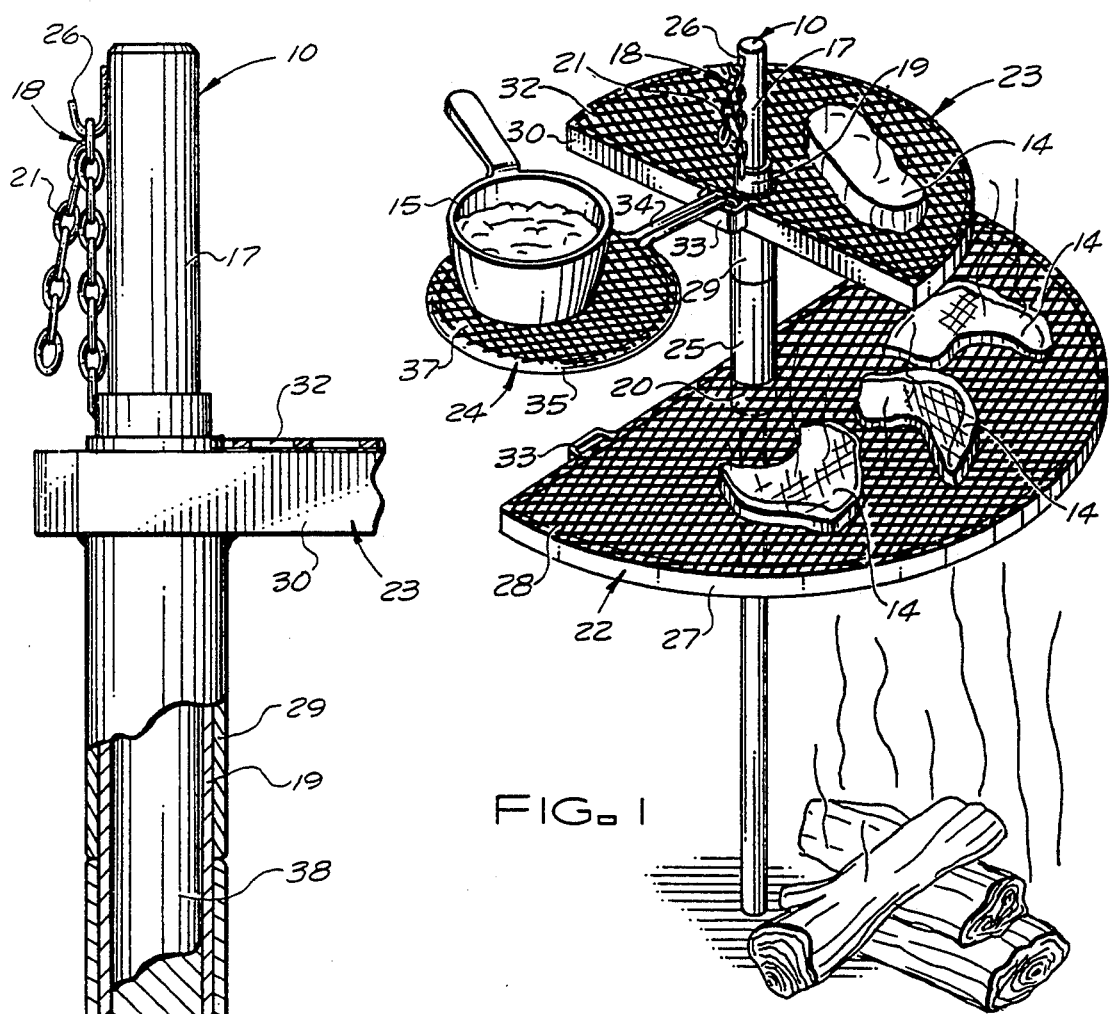
FIG. 1 is a perspective view of a portable grill assembly, constructed in accordance with the teachings of the instant invention.

Turning now to the drawings, in which like reference characters indicate corresponding elements throughout the several views, attention is first directed to FIG. 1 which illustrates a portable grill assembly generally designated 10, which embodies the instant invention as it would appear set up in ground 12 over a fire 13 in a position for cooking food 14 and for warming a pot 15. Portable grill assembly 10 includes a vertical grill base 17, an adjustment assembly 18, and an inner sleeve 19 which is slidably and rotatably received about vertical grill base 17. A stop 20 is affixed adjacent to the lower end of inner sleeve 19 preferably by welding. Stop 20 supports a lower grill portion 22 and an upper grill portion 23 on inner sleeve 19.

Lower grill portion 22 includes a lower collar 25, a lower grating frame 27 and a lower grating 28. Lower collar 25 is rotatably and slidably received about inner sleeve 19 for movement about vertical grill base 17 and supported by stop 20. Lower grating frame 27 is attached to lower collar 25 by welding or the like, to extend outwardly therefrom. Lower grating 28 attaches to lower grating frame 27 by any conveniently known means, such as welding, for support of food 14 over fire 13. Lower grill portion 22 supports upper grill portion 23 in this embodiment.

Upper grill portion 23 includes an upper collar 29, an upper grating frame 30, and an upper grating 32. Upper collar 29 is rotatably and slidably received about inner sleeve 19, and, in this embodiment, supported by collar 25 to facilitate movement about vertical grill base 17. Upper grating frame 30 is attached to upper collar 29, by welding or the like, to extend outwardly therefrom. Upper grating 32 attaches to upper grating frame 30 by any conveniently known means, such as welding, for support of food 14 over fire 13.

Lower grill portion 22 and upper grill portion 23 are raised and lowered by a sliding movement of inner sleeve 19 on vertical grill base 17. Inner sleeve 19 is secured by adjustment assembly 18. Adjustment assembly 18 has a chain 21 affixed adjacent to the upper end of inner sleeve 19 by any conveniently known means, such as welding. A J hook 26 is affixed adjacent to the upper end of vertical grill base 17 preferably by a set screw, but it will be understood that any known attachment means such as welding, etc., may be used. Chain 21 engages J hook 26 to arrest slidable movement of inner sleeve 19 about vertical grill base 17 when positioned at a desired height. It should be understood that while chain 21 is illustrated in this embodiment virtually any flexible member, such as a wire, cable, etc., may be used. Further, while J hook 26 is illustrated for example, any suitable anchor, such as a screw, bolt, or the like can be used.

One or more brackets 33 (two in this embodiment) are affixed to an edge of lower grill portion 22. Also, one or more brackets 33 (one in this embodiment) are affixed to an edge of upper grill portion 23 in a convenient manner such as welding. Brackets 33 are provided for attachment of one or more accessory grill portions 24 which, in FIG. 1, supports pot 15 over fire 12. Accessory grill portion 24 includes an elongated handle 34, an accessory grating frame 35, and an accessory grating 27, which is generally circular.

Figure 2:
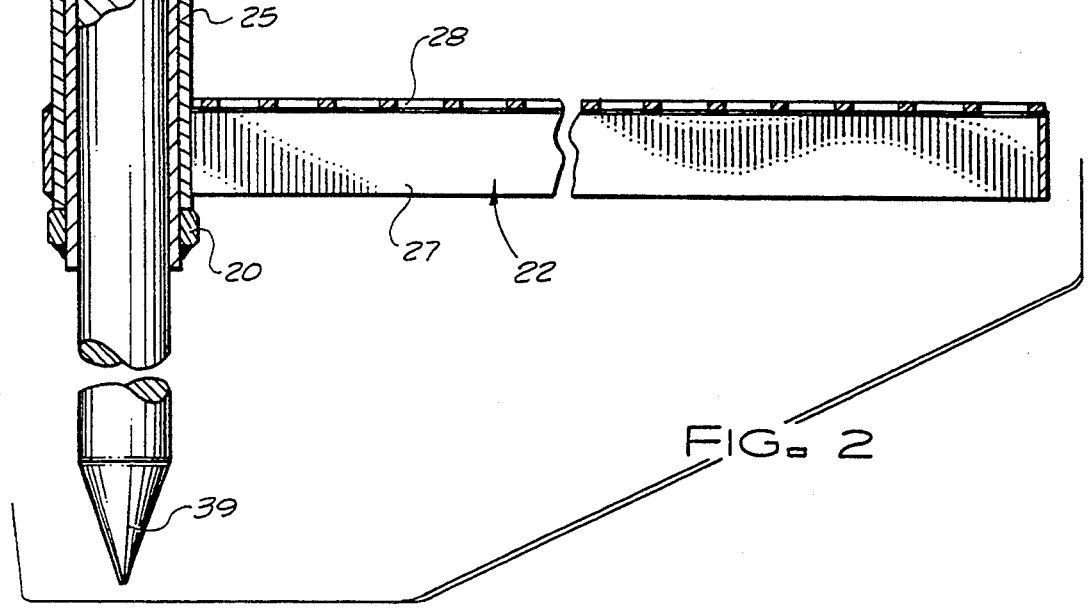
FIG. 2 is an enlarged cross-sectional view, portions thereof broken away illustrating portions of the portable grill assembly of FIG. 1 in more detail.

Referring specifically to FIG. 2, an enlarged cross-sectional view of portable grill assembly 10 is illustrated, where portions of inner sleeve 19, lower collar 25, upper collar 29, and stop 20 are broken away to illustrate vertical grill base 17. Vertical grill base 17 includes an elongated rod 38 having a tapered end 39 for easy insertion in ground 12. Inner sleeve 19, in this embodiment is an elongated tubular member having an inner diameter larger than an outer diameter of elongated rod 38. Lower collar 25 and upper collar 29 are tubular members having an inner diameter larger than an outer diameter of inner sleeve 19.

A top plan view of portable grill assembly 10 is illustrated in FIG. 3. Lower grill portion 22 is formed with lower grating frame 27 which includes a semi-circular frame member 44 and a plurality of radially extending grating supports 45 for support of lower grating 28. Semi-circular frame member 44 is affixed to lower collar 25 at approximately the axis of semi-circular frame member 44 with grating supports 45 radiating outwardly therefrom. Also illustrated, upper grill portion 23 is formed with upper grating frame 30 which includes a semi-circular frame member 47 and a plurality of radially extending grating supports 48 for support of upper grating 32. Upper grating frame 30 is essentially a reduced version of lower grating frame 27.

In the embodiment illustrated in FIG. 3 of portable grill assembly 10, an accessory grill portion 24a is attached to upper grill portion 23 by a bracket 33a and an accessory grill portion 24b is attached to lower grill portion 22 by a bracket 33b. Accessory grill portion 24a is formed with a substantially circularly shaped accessory grating frame 35a, an integrally formed elongated handle 34a, and a generally circular accessory grating 37a. Accessory grill portion 24b is formed with a substantially circularly shaped accessory grating frame 35b, an integrally formed elongated handle 34b, and a generally circular accessory grating 37b. A third bracket 33c is provided on lower grill portion 22 but is not used in this example. In an alternate embodiment accessory grating 37a or 37b may be omitted, so that a cooking accessory such as a pot or wok may be suspended from frame 35a or 35b.

Brackets 33a, 33b, and 33c are generally U-shaped portions. Bracket 33a is fixedly attached to the diametric edge of semi-circular frame member 47. Brackets 33b and 33c are fixedly attached to the diametric edge of semi-circular frame member 44. Brackets 33a, 33b, and 33c are affixed to the frame members so as to form a vertical slot.

FIG. 4 illustrates elongated handle 34 of accessory grill portion 24. As illustrated, elongated handle 34 is an extension of and integrally formed with accessory grating frame 35. Elongated handle 34 is bent approximately 90 degrees adjacent to an outer end 50 to form a hook 49 for engaging a vertical slot in one of the plurality of brackets 33. Because hook 49 is bent at 90 degrees, accessory grating frame 35 is maintained substantially parallel to upper grill portion 23 and lower grill portion 22.

FIG. 5 is a perspective view of a base assembly 52 which includes a partially spherical base member 53 and an axially upwardly extending support ring 54. Ring support 54 is affixed to base member 53 by welding or the like. Ring support 54 is constructed to receive tapered end 39 of vertical grill base 17 for support of portable grill assembly 10 over fire 13 in another embodiment. Generally, base assembly 52 is provided for support of portable grill assembly 10 in applications where it is impractical to insert tapered end 39 of vertical grill base 17 in ground 12.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by fair interpretation of the following claims.

Having fully described the invention in such clear and concise terms as to enable those skilled in the art to understand and practice the same, the invention claimed is:

1. A portable grill assembly comprising:
   a vertical grill base having an upper and lower end;
   an inner sleeve rotatably and slidably received about the vertical grill base for movement along the vertical grill base between the upper and lower ends;
   an adjustment assembly affixed to the inner sleeve for limiting movement of the inner sleeve along the vertical grill base;
   said adjustment assembly further including an anchor affixed adjacent to the upper end of the vertical grill base and a flexible member affixed to the inner sleeve for engagement of the anchor allowing the inner sleeve to be raised and lowered relative to the fire;
   a plurality of grill portions rotatably mounted on the inner sleeve extending outwardly from the inner sleeve, each of the plurality of grill portions being constructed for support of gratings over a fire; and
   a stop affixed adjacent to the lower end of the inner sleeve for support of the plurality of grill portions.

2. A portable grill assembly as claimed in claim 1 wherein the vertical base includes an elongated rod having a tapered lower end.

3. A portable grill assembly as claimed in claim 2 wherein the inner sleeve includes a tubular member having an inner diameter larger than an outer diameter of the vertical base.

4. A portable grill assembly as claimed in claim 1 wherein the anchor includes a J hook.

5. A portable grill assembly as claimed in claim 1 wherein a chain constitutes the flexible member.

6. A portable grill assembly as claimed in claim 1 wherein the plurality of grill portions each include a collar rotatably and slidably received about the inner sleeve, a grating frame affixed to the collar, and a grating attached to the grating frame.

7. A portable grill assembly as claimed in claim 1 having a plurality of brackets affixed to an edge of at least one of the grill portions for attachment of accessory grill portions.

8. A portable grill assembly as claimed in claim 7 having in addition an accessory grill portion.

9. A portable grill assembly as claimed in claim 8 wherein the accessory grill portion includes an elongated handle and an accessory frame.

10. A portable grill assembly comprising:
a vertical grill base having an upper and lower end;
an inner sleeve rotatably and slidably received about the vertical grill base for movement along the vertical grill base between the upper and lower ends;
an adjustment assembly affixed to the inner sleeve for limiting movement of the inner sleeve along the vertical grill base;
a plurality of grill portions rotatably mounted on the inner sleeve extending outwardly from the inner sleeve, each of the plurality of grill portions being constructed for support of gratings over a fire;
a stop affixed adjacent to the lower end of the inner sleeve for support of the plurality of grill portions;
a plurality of brackets affixed to an edge of at least one of the grill portions for attachment of accessory grill portions; and
an accessory grill portion including an elongated handle, an accessory grating frame and an accessory grating;
wherein the elongated handle has a hook at an outer end for engaging one of the plurality of brackets so as to maintain the accessory grating frame substantially parallel to at least one grill portion.

11. A portable grill assembly comprising:
an elongated vertical grill base having an upper and a lower end;
an inner sleeve rotatably and slidably received about the vertical grill base for movement about the vertical grill base;
an adjustment assembly affixed to the inner sleeve for positioning of the inner sleeve along the vertical grill base;
said adjustment assembly further including an anchor affixed adjacent to the upper end of the vertical grill base and a flexible member affixed adjacent to the inner sleeve for engagement of the anchor allowing the inner sleeve to be raised and lowered relative to the fire;
an upper grill portion rotatably and slidably mounted on the inner sleeve for movement about the vertical grill base;
a lower grill portion rotatably and slidably mounted on the inner sleeve for movement about the vertical grill base; and
a stop affixed adjacent the lower end of the inner sleeve for support of the upper and lower grill portions.

12. A portable grill assembly as claimed in claim 11 wherein the anchor includes a J hook.

13. A portable grill assembly as claimed in claim 11 wherein a chain constitutes the flexible member.

14. A portable grill assembly as claimed in claim 11 wherein the lower grill portion includes a lower collar rotatably and slidably received about the inner sleeve, a lower grating frame affixed to the lower collar, and a lower grating attached to the lower grating frame.

15. A portable grill assembly as claimed in claim 11 having a plurality of brackets affixed adjacent to an edge of each of the upper and lower gratings for attachment of accessory grill portions.

16. A portable grill assembly as claimed in claim 15 having in addition an accessory grill portion which includes an elongated handle, an accessory grating frame and an accessory grating.

17. A portable grill assembly comprising:
an elongated vertical grill base having an upper and a lower end;
an inner sleeve rotatably and slidably received about the vertical grill base for movement about the vertical grill base;
an adjustment assembly affixed to the inner sleeve for positioning of the inner sleeve along the vertical grill base;
an upper grill portion rotatably and slidably mounted on the inner sleeve for movement about the vertical grill base;
said upper grill portion further including an upper collar rotatably and slidably received about the inner sleeve, an upper grating frame affixed to the upper collar, and an upper grating attached to the upper grating frame;
a lower grill portion rotatably and slidably mounted on the inner sleeve for movement about the vertical grill base; and
a stop affixed adjacent the lower end of the inner sleeve for support of the upper and lower grill portions;

18. A portable grill assembly comprising:
an elongated vertical grill base having an upper and a lower end;
an inner sleeve rotatably and slidably received about the vertical grill base for movement about the vertical grill base;
an adjustment assembly affixed to the inner sleeve for positioning of the inner sleeve along the vertical grill base;
an upper grill portion rotatably and slidably mounted on the inner sleeve for movement about the vertical grill base;
a lower grill portion rotatably and slidably mounted on the inner sleeve for movement about the vertical grill base;
a stop affixed adjacent the lower end of the inner sleeve for support of the upper and lower grill portions;
having a plurality of brackets affixed adjacent to an edge of each of the upper and lower gratings for attachment of accessory grill portions; and
an accessory grill portion which includes an elongated handle, an accessory grating frame and an accessory grating;
wherein the elongated handle has a hook at an outer end for engaging one of the plurality of brackets so as to maintain the accessory grating frame substantially parallel to the grill portion.

19. A portable grill assembly comprising:
an elongated vertical grill base having an upper and a lower end;

an inner sleeve rotatably and slidably received along the vertical grill base for movement about the vertical grill base;

an adjustment assembly affixed to the inner sleeve for positioning of the inner sleeve along the vertical grill base;

an upper grill portion rotatably and slidably mounted on the inner sleeve for movement about the vertical grill base;

said upper grill portion including an upper collar rotatably and slidably received about the inner sleeve, an upper grating frame affixed to the upper collar, and an upper grating attached to the upper grating frame a lower grill portion rotatably and slidably mounted on the inner sleeve for movement about the vertical grill base;

a stop affixed adjacent to the lower end of the inner sleeve for support of the upper and lower grill portions; and a plurality of brackets, at least one of which is affixed adjacent to an edge of each of the grill portions for attachment of accessory grill portions.

20. A portable grill assembly as claimed in claim 19 wherein the adjustment assembly includes a J hook affixed adjacent to the upper end of the vertical grill base and a chain affixed to the inner sleeve for engagement of the J hook allowing the inner sleeve to be raised and lowered relative to the fire.

21. A portable grill assembly as claimed in claim 19 wherein the lower grill portion includes a lower collar rotatably and slidably received about the inner sleeve, a lower grating frame affixed to the lower collar, and a lower grating attached to the lower grating frame.

22. A portable grill assembly comprising:

an elongated vertical grill base having an upper and a lower end;

an inner sleeve rotatably and slidably received along the vertical grill base for movement about the vertical grill base;

an adjustment assembly affixed to the inner sleeve for positioning of the inner sleeve along the vertical grill base;

an upper grill portion rotatably and slidably mounted on the inner sleeve for movement about the vertical grill base;

a lower grill portion rotatably and slidably mounted on the inner sleeve for movement about the vertical grill base;

a stop affixed adjacent to the lower end of the inner sleeve for support of the upper and lower grill portions;

a plurality of rackets, at least one of which is affixed adjacent to an edge of each of the grill portions for attachment of accessory grill portions; and an accessory grill portion further including an elongated handle, an accessory grating frame and an accessory grating.

23. A portable grill assembly as claimed in claim 22 wherein the elongated handle has a hook at an outer end for engaging one of the plurality of brackets so as to maintain the accessory grating frame substantially parallel to the grill portion.

* * * * *

UNITED STATES PATENT AND TRADEMARK OFFICE
CERTIFICATE OF CORRECTION

PATENT NO. : 5,355,867
DATED : 18 October 1994
INVENTOR(S) : Richard L. Hall and Jeffrey D. Hebets It is certified that error appears in the above-indentified patent and that said Letters Patent is hereby corrected as shown below:

Claim 22, column 8, line 21, delete "rackets" after "a plurality of" and insert --brackets--.

Signed and Sealed this

Tenth Day of January, 1995

Attest:

BRUCE LEHMAN

*Attesting Officer*     Commissioner of Patents and Trademarks